US010890259B2

(12) United States Patent
Villanueva et al.

(10) Patent No.: US 10,890,259 B2
(45) Date of Patent: Jan. 12, 2021

(54) POPPET VALVE SYSTEM AND PROCESS

(71) Applicant: Dukes Aerospace, Inc., Painesville, OH (US)

(72) Inventors: Carlos Villanueva, Painesville, OH (US); Chad Fleming, Painesville, OH (US)

(73) Assignee: DUKES AEROSPACE, INC., Painesville, OH (US)

(*) Notice: Subject to any disclaimer, the term of this patent is extended or adjusted under 35 U.S.C. 154(b) by 53 days.

(21) Appl. No.: 16/196,721

(22) Filed: Nov. 20, 2018

(65) Prior Publication Data
US 2019/0154157 A1  May 23, 2019

Related U.S. Application Data

(60) Provisional application No. 62/589,200, filed on Nov. 21, 2017.

(51) Int. Cl.
| F16K 31/06 | (2006.01) |
| F16K 31/124 | (2006.01) |
| F16K 1/12 | (2006.01) |
| F16K 1/38 | (2006.01) |
| F16K 31/42 | (2006.01) |
| F16K 31/40 | (2006.01) |
| F02C 9/18 | (2006.01) |
| F16K 31/122 | (2006.01) |

(52) U.S. Cl.
CPC ............... F16K 1/12 (2013.01); F16K 1/123 (2013.01); F16K 1/126 (2013.01); F16K 1/38 (2013.01);
(Continued)

(58) Field of Classification Search
CPC ......... Y10T 137/3421; Y10T 137/3367; Y10T 137/353; Y10T 137/3476; F16K 1/12;
(Continued)

(56) References Cited

U.S. PATENT DOCUMENTS 2,919,714 A * 1/1960 Mrazek ............... F16K 1/126
                                                137/220
3,380,469 A * 4/1968 Salerno ............... F16K 31/42
                                                137/219
(Continued)

FOREIGN PATENT DOCUMENTS

DE  102014225128 A1  9/2015
WO  2017/165603 A1  9/2017

OTHER PUBLICATIONS

International Search Report and Written Opinion issued in PCT/US18/62040, dated Jan. 31, 2019.

*Primary Examiner* — Matthew W Jellett
(74) *Attorney, Agent, or Firm* — BakerHostetler

(57) ABSTRACT

Aspects herein include a valve to provide regulated fluid flow. The valve comprises a valve housing having an inlet and an outlet. The valve further comprises a valve seat disposed between the inlet and the outlet of the valve. The valve seat has a seat opening defined by a seat opening dimension and is fixed in relation to the valve housing. The valve further comprises a poppet disposed between the valve seat and the outlet of the valve, the poppet having a seat face opposing the valve seat. The seat face tapers from a poppet large dimension larger than the seat-opening dimension disposed toward the inlet end to a poppet small dimension smaller than the seat-opening dimension disposed toward the outlet end. The valve further comprises a plunger operatively coupled with the poppet as well as a solenoid within the valve chamber operatively coupled with the plunger.

18 Claims, 8 Drawing Sheets

(52) U.S. Cl.
CPC .......... *F16K 1/385* (2013.01); *F16K 31/0655* (2013.01); *F16K 31/0658* (2013.01); *F16K 31/40* (2013.01); *F16K 31/406* (2013.01); *F16K 31/42* (2013.01); *F02C 9/18* (2013.01); *F05D 2260/606* (2013.01); *F16K 31/122* (2013.01); *F16K 31/124* (2013.01); *F16K 31/1245* (2013.01); *Y10T 137/3367* (2015.04); *Y10T 137/3421* (2015.04); *Y10T 137/3476* (2015.04); *Y10T 137/353* (2015.04)

(58) Field of Classification Search
CPC .......... F16K 1/123; F16K 1/126; F16K 1/303; F16K 1/38; F16K 1/385; F16K 17/046; F16K 31/40; F16K 31/42; F16K 31/406; F16K 31/0655; F16K 31/0658; F16K 31/0693; F16K 31/122; F16K 31/124; F16K 31/1245; F15B 13/0405
USPC ...... 137/219–222; 251/30.01–30.05, 129.03, 251/129.07, 129.08, 129.15, 129.18, 251/129.19
See application file for complete search history.

(56) References Cited

U.S. PATENT DOCUMENTS

| | | | |
|---|---|---|---|
| 3,415,269 A * | 12/1968 | Salerno | F16K 31/42 137/219 |
| 3,489,165 A * | 1/1970 | Salerno | G05D 16/166 137/220 |
| 3,566,907 A * | 3/1971 | Sime | F16K 1/126 137/219 |
| 3,750,693 A | 8/1973 | Hardison | |
| 3,792,716 A * | 2/1974 | Sime | F16K 1/126 137/492 |
| 3,825,026 A * | 7/1974 | Salerno | F01D 17/145 137/219 |
| 4,610,265 A * | 9/1986 | Nelson | F16K 1/126 137/219 |
| 4,997,161 A * | 3/1991 | Hutchison | F23N 1/005 251/129.08 |
| 5,143,118 A * | 9/1992 | Sule | F16K 31/0675 137/554 |
| 5,271,430 A * | 12/1993 | Muruyama | F16K 3/24 137/484.4 |
| 6,899,313 B2 * | 5/2005 | Carrillo | F16K 31/0665 123/90.12 |
| 7,712,483 B2 * | 5/2010 | Nigliazzo | F16K 31/0655 137/546 |
| 9,689,315 B2 * | 6/2017 | Marocchini | F01D 17/105 |
| 9,803,558 B2 * | 10/2017 | Villanueva | F02C 6/08 |
| 9,849,992 B2 * | 12/2017 | Goodman | B64D 15/04 |
| 10,125,889 B2 * | 11/2018 | Pekarsky | F16K 15/183 |
| 10,145,205 B2 * | 12/2018 | Martino | E21B 34/02 |
| 10,378,654 B2 * | 8/2019 | Villanueva | G05D 16/2097 |
| 10,519,864 B2 * | 12/2019 | Greenberg | F01D 17/141 |
| 2017/0191419 A1 | 7/2017 | Bayraktar et al. | |

* cited by examiner

POPPET VALVE SYSTEM AND PROCESS

CROSS REFERENCE TO PRIOR APPLICATIONS

This application claims the benefit of U.S. Provisional Application No. 62/589,200 filed on Nov. 21, 2017, which is hereby incorporated by reference in its entirety for all purposes as if fully set forth herein.

BACKGROUND OF THE DISCLOSURE

Field of the Disclosure

The disclosure generally relates to an apparatus and process for implementing a poppet valve system. Specifically, the disclosure relates to a poppet valve system and process configured to open in a manner to provide greater clearance dimensions. Moreover, the disclosure relates to a poppet valve system and process configured to open in a manner to provide greater clearance dimensions for control of valve systems.

Related Art

Pressure regulating valves have a number of applications in a wide variety of areas that use pressurized fluids to drive pneumatic systems. These systems typically require one or more pressure regulating valves controlled through electronic systems to permit operation remotely. One application for these pressure-regulating valves are in aircraft systems that utilize, for example, a turbine engine.

Because these pressure-regulating valves are used in critical functions of the aircraft, such as the de-icing of engine cowls, it is important to introduce valves more resistant to failure. One such failure can include a re-seating failure whereby the valve cannot close or properly seat due to the presence of contamination, such as foreign object debris, between moving parts of the valve. Such contamination can be easily introduced into such systems that are operating in open environments.

Accordingly, there is a need for pressure regulating valve systems that are resistant to blockages while also being compact and lightweight.

SUMMARY OF THE DISCLOSURE

There has thus been outlined, rather broadly, certain aspects of the disclosure in order that the detailed description thereof herein may be better understood and in order that the present contribution to the art may be better appreciated. There are, of course, additional aspects of the disclosure that will be described below and which will form the subject matter of the claims appended hereto.

In one aspect, a poppet valve includes a valve housing having an inlet at an inlet end, which receives a fluid, and an outlet at an outlet end, which provides regulated fluid flow. The structure of the valve housing defines at least a valve chamber. A valve seat is disposed between the inlet and the outlet of the valve and has a seat opening defined by a seat-opening dimension. The valve seat is fixed in relation to the valve housing. The valve further includes a poppet disposed between the valve seat and the outlet of the valve. The poppet has a seat face opposing the valve seat and an outlet face opposing the outlet end. The seat face tapers from a poppet large dimension larger than the seat-opening dimension disposed toward the inlet end to a poppet small dimension smaller than the seat-opening dimension disposed toward the outlet end. The poppet can be movable in relation to the valve housing. The valve further includes a plunger operatively coupled with the poppet. The plunger is disposed toward the inlet end, the plunger is movable in relation to the valve housing. The valve also includes a solenoid within the valve chamber operatively coupled with the plunger, the solenoid provides a displacement force on at least the plunger.

In another aspect, a process for using a valve includes providing a valve including a valve seat, a poppet, and an actuator. The valve seat is disposed between an inlet and an outlet of the valve and has a seat opening defined by a seat-opening dimension. The valve seat is fixed in relation to the valve. The poppet has a seat face opposing the valve seat and an outlet face disposed toward the outlet. The seat face tapers from a poppet large dimension larger than the seat-opening dimension disposed toward the inlet end to a poppet small dimension smaller than the seat-opening dimension disposed toward the outlet. The poppet is movable in relation to the valve housing. The actuator is operatively coupled with the poppet. The process further includes energizing the actuator to open the valve by causing the seat face of the poppet to move at least an offset distance from the valve seat during an opening operation.

In some aspects, poppet valves like those described can be used with valve systems to provide a regulated fluid flow. Such systems can include a piston assembly controlled by a valve including the poppet valve disclosed herein.

In further aspects, poppet valves like those described can be used with redundant valve systems to provide a regulated fluid flow. Such systems can include two or more piston assemblies controlled by valves including one or more of the poppet valves disclosed herein.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, processes, and systems for carrying out the several purposes of the disclosure. It is important, therefore, that the claims be regarded as including such equivalent constructions insofar as they do not depart from the spirit and scope of the disclosure.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

DETAILED DESCRIPTION

Pressure regulating valves have a number of applications in a wide variety of areas that use pressurized fluids to drive pneumatic systems. These systems typically require one or more pressure regulating valves controlled through electronic systems to permit operation remotely. One application for these pressure-regulating valves are in aircraft systems that utilize turbine engines.

Due to the cold ambient conditions during flight, aircraft often use bleed air from the turbine engines in order to perform de-icing of exterior portions of the aircraft such as engine cowls, wings, and the like. This bleed air can also be used to maintain cabin pressurization, de-ice windows, maintain temperature of the cabin and luggage compartments, assist in the function of ejector seats, provide air for blown flaps, provide air for windshield blow mechanisms, and the like. For example, the de-icing of the engine cowls typically requires pressure regulating valves to regulate the bleed air to compensate for variations in throttle settings, icing conditions, and the like and to allow the system to be controlled automatically or from the aircraft cockpit. In some aspects, the automatic control may be from a centralized maintenance system, a flight warning system, a flight management system, a computer system, an application-specific integrated circuit (ASIC), a field-programmable gate array (FPGA), a controller, a microprocessor, or the like.

These valves need to be reliable in performance, low in weight, and compact in size. In one aspect, the valves are self-powered. In one aspect, the valves are powered using the pressure generated within the system itself for supplying the energy to actuate the valve.

Reference in this specification to "one aspect," "an aspect," "other aspects," "one or more aspects," or the like means that a particular feature, structure, or characteristic described in connection with the aspect is included in at least one aspect of the disclosure. The appearance of, for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not other aspects.

As used herein, the phrase "operatively coupled" refers to components, which act in concert, but need not be in physical contact. Operatively coupled components may act in a complementary fashion, or may act upon one another directly or at a distance through their individual action. Such arrangements are also not exclusive, as distinct elements, which are operatively coupled, may be arranged at a distance during certain operational conditions, and brought into contact during other operational conditions.

Figure 1:
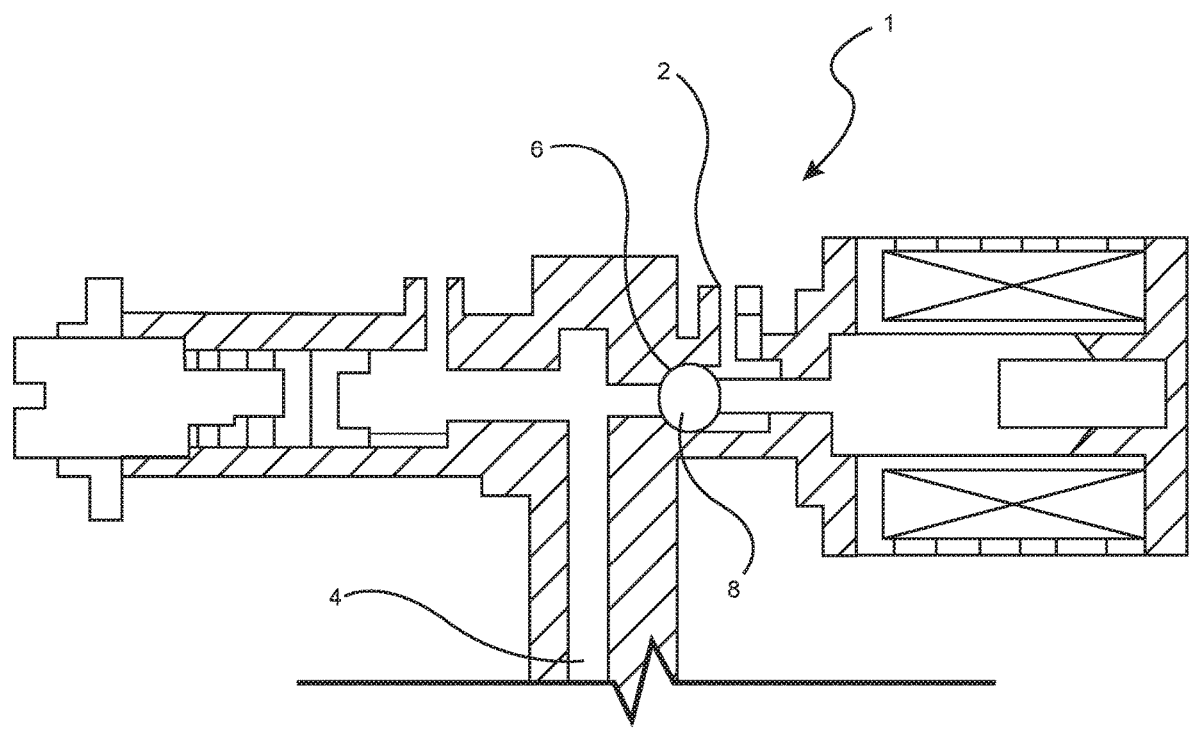
FIG. 1 illustrates an example ball valve.

FIG. 1 illustrates an example ball valve. In particular, FIG. 1 illustrates a portion of an example system using a ball valve 1. The ball valve 1 regulates and opens to permit or restrict fluid flow through, e.g., a vent 2. The ball valve 1 may be a solenoid operated valve or another similar valve. When the ball valve 1 is not used to regulate fluid flow through an associated valve system, the ball 8 blocks a connection 4 to the vent 2. When the ball valve 1 is in operation, the ball 8 may be actuated by the ball valve 1 to cause the ball 8 to extend within the ball valve 1 to permit fluid flowing through the connection 4 to travel through to the vent 2.

One drawback of such ball valve systems as that illustrated in FIG. 1 is a displacement distance of the ball 8 from a valve seat 6 on which the ball 8 rests when closed. In aspects, the ball 8 may only displace 0.005 inch from a valve seat on which it rests when closed. In such an implementation, small bits of particulate matter may become wedged between ball 8 and the valve seat 6, preventing the ball 8 from returning to a closed position. In other words, the ball 8 is unable to fully return to the valve seat 6 preventing a complete closure of the ball valve 1. Because of the limited range of motion of the ball 8, debris blown through the connection 4 (or which may accumulate through the vent 2 when the ball valve 1 is closed) presents a failure risk.

Figure 2:
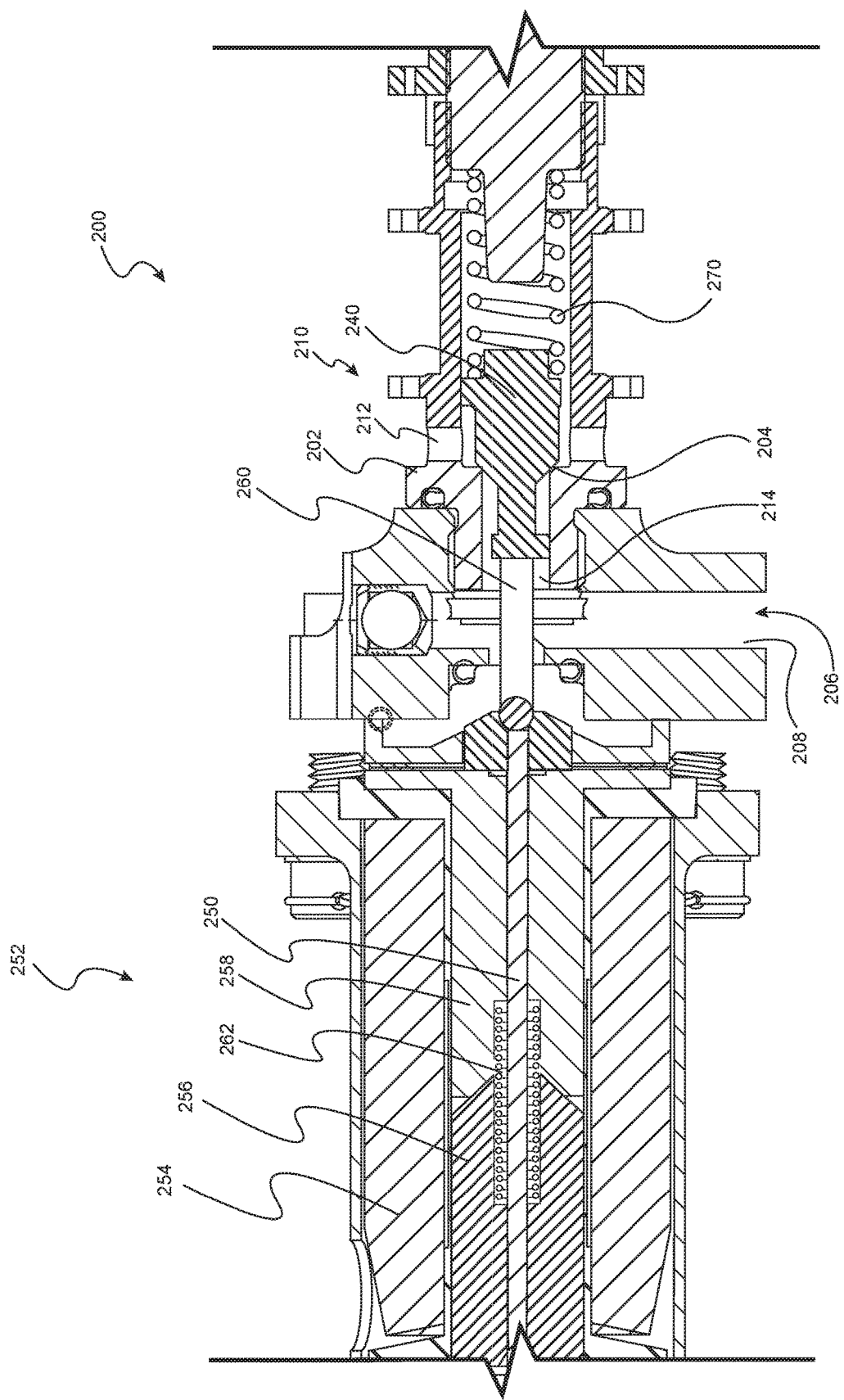
FIG. 2 illustrates a partial cross-sectional view of a poppet valve according to the disclosure.
Figure 3:
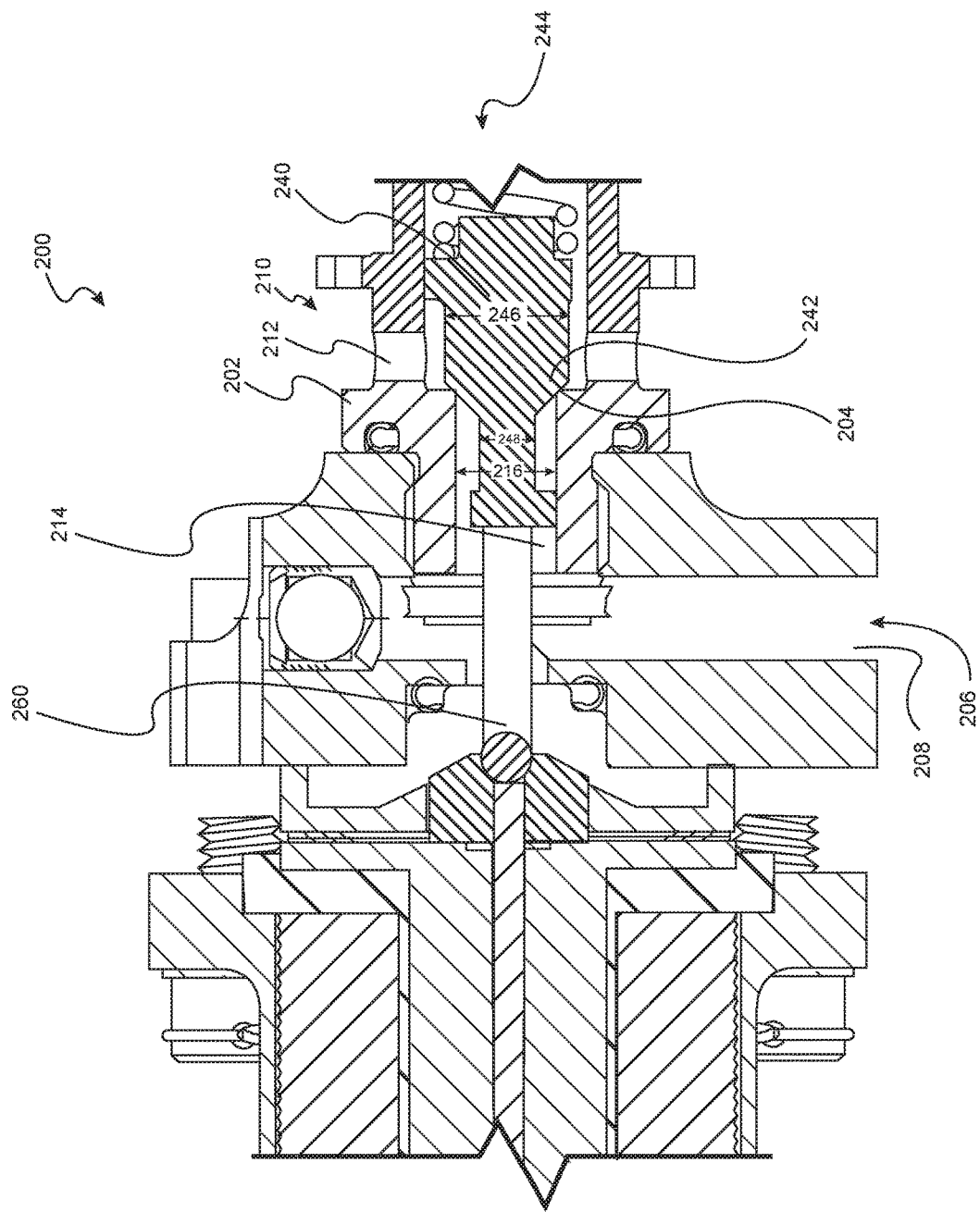
FIG. 3 illustrates a partial cross-sectional view of the poppet valve of FIG. 2 in a closed position.
Figure 4:
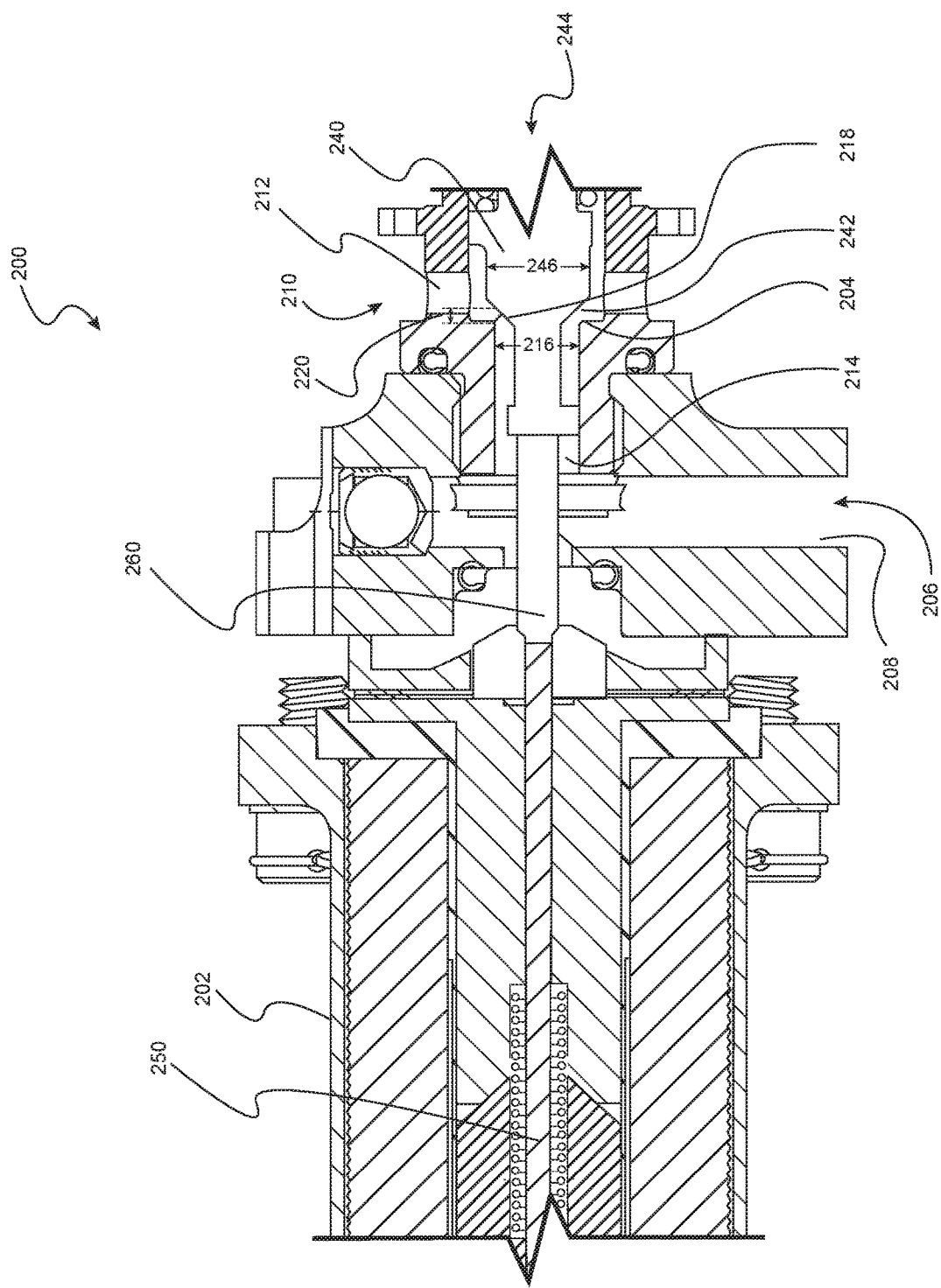
FIG. 4 illustrates a partial cross-sectional view of the poppet valve of FIG. 2 in an open position.

FIG. 2 illustrates a partial cross-sectional view of a poppet valve according to the disclosure; FIG. 3 illustrates a partial cross-sectional view of the poppet valve of FIG. 2 in a closed position; and FIG. 4 illustrates a partial cross-sectional view of the poppet valve of FIG. 2 in an open position. In particular, FIGS. 2, 3, and 4 illustrate an alternative valve 200 using a poppet 240. More particularly, the alternative valve 200 includes a valve housing 202 defining at least a valve chamber 214. The valve housing 202 may include an inlet 208 at an inlet end 206 and a vent 212 at an outlet end 210. The valve housing 202 may be generally cylindrical and constructed of metallic, synthetic, or other materials. The valve housing 202 is constructed to selectively allow fluid (pressurized or unpressurized) to flow through the valve 200 and the flow of fluid may be regulated by the valve 200. A valve seat 204 may be integral to or coupled with the valve housing 202 and disposed between the inlet 208 and the vent 212 along the path of fluid flow through the valve 200.

The valve 200 may also include an actuator 250 to open and close the valve 200 by moving a poppet 240 toward or away from the valve seat 204. The actuator 250 can act directly on the poppet 240, through a shaft 260, or the like. In aspects, the actuator 250 is a solenoid 252. The solenoid 252 may be an electromechanical solenoid that may include an electromagnetically inductive coil 254, that may be wound around a movable slug 256, or similar structure. The movable slug 256 may be formed of steel, iron, or the like The solenoid 252 may further include a fixed core 258. Finally, the solenoid 252 may further include a core spring 262 configured to urge the shaft 260 into a position to allow the poppet 240 to be in a closed position. Other implementations of the solenoid 252 are contemplated as well. Moreover, other types of actuators may be utilized in lieu of the solenoid 252.

The valve 200 may further include a spring 270 that engages a back surface of the poppet 240 to urge the poppet 240 into the closed position as shown in FIG. 2. In particular, the spring 270 may apply a force to the poppet 240 to urge the poppet 240 toward the closed position. As illustrated in FIG. 3, the valve seat 204 may have a seat opening defined by seat opening dimension 216, which describes at least one dimension of the valve chamber 214. The poppet 240 may include the seat face 242, which contacts the valve seat 204 when the valve 200 is closed. The poppet 240 also may include a valve face 244 opposite the seat face 242. The poppet 240 may be a generally conical shaped structure and the valve seat 204 may have a corresponding conical shaped surface. However, other shaped surfaces are contemplated as well. The seat face 242 may be defined by a poppet large dimension 246, which is larger than the seat opening dimension 216. In some aspects, the seat face 242 may taper, step, or otherwise reduce its cross section to a poppet small dimension 248, which is smaller than the seat opening dimension 216 and therefore capable of low- or no-interference relative movement in relation thereto. In this regard, the poppet 240 may be movable in relation to the valve housing 202, moving off the valve seat 204 to open the valve 200 (see FIG. 4) and then returning back to close the valve 200 (see FIG. 3). In this regard, FIG. 3 shows the poppet 240 seated on a valve seat 204; and FIG. 4 illustrates the poppet 240 moved from the valve seat 204 by an offset distance 218.

In aspects, the shaft 260 may be coupled with the poppet 240 toward the inlet end 206 and/or the poppet small dimension 248. The shaft 260 can be, e.g., a plunger, a probe, or other appropriate structures for linking or extending through components. The shaft 260 may be movable in relation to the valve housing 202, and may be movable or fixed in relation to the poppet 240. In some aspects, the shaft 260 may be a separate structure that engages the poppet 240 only when actuated. In other aspects, the shaft 260 may be integral with the poppet 240 and accordingly is always attached.

In a particular aspect, the shaft 260 may be operatively coupled with the poppet 240 in a manner to facilitate its motion in the valve 200 based on operating conditions. During uninterrupted operation, the actuator 250 may be actuated and the poppet 240 may be displaced appropriately from its valve seat 204 to allow the desired flow. For example, to provide the desired flow to properly position a main valve piston (e.g., piston assembly 546, discussed below). This may be defined as a normal operation mode. When operation is interrupted (e.g., by foreign object debris), the main valve can be shut and the actuator 250 can be engaged to push the poppet 240 further off its valve seat 204 (e.g., through shaft 260) to increase flow (e.g., to create space and pressure to clear foreign object debris) before returning to uninterrupted operation. This may be defined as a cleaning operational mode.

The actuator 250 (and/or other elements) may move the poppet 240 from the valve seat 204 to open the valve 200, creating a space for fluid to flow defined at least in part by the offset distance 218, which is dependent on a displacement distance 220 (visible in FIG. 4) through which the poppet 240 is pushed. Movement of the poppet 240 can be controlled to provide a level of clearance by the offset distance 218 sufficient to allow an average contaminant or a largest possible contaminant to flow through. In this regard, an "average contaminant size" can be the average size of particulate matter in a particular application of the valve 200, such as the average size of dust, carbon, sand, dirt, or other materials in the operating environment. This can be determined experimentally or estimated based on the application. The largest possible contaminant size is less than or equal to the size of the smallest clearance upstream of the seat face 242, which will be dictated by the dimensions of, e.g., the valve chamber 214 (with or without the inclusion of the poppet 240 providing interference therein), the inlet 208, or other components which would prevent a larger contaminant from reaching the seat face 242 and risk jamming of the poppet 240 apart from the valve seat 204. In aspects, the poppet 240 can be configured to be offset (e.g., move to create offset distance 218) from the valve seat 204 by more than 0.005 inch (the clearance typically provided by a ball valve such as that in FIG. 1). In alternative or complementary aspects, the poppet 240 can be configured to be offset from the valve seat 204 by approximately 0.04 inch or any other distance. In aspects, the displacement distance 220 (and accordingly the offset distance 218) is variable based on the actuator 250, permitting increasing or decreasing of the offset distance 218.

In a particular aspect, the valve 200 may include or be operatively coupled with a sensor. In one aspect, the sensor may be a position sensor to determine a position of the poppet 240. In this regard, the position sensor may determine an actual position of the poppet 240 when it should be closed and compare that to a value indicative of a desired closed position of the poppet 240. If the actual position is not the same as the desired closed position, or not within a threshold, the sensor in conjunction with the controller may determine a possible valve failure. The position sensor may be one or more of a Capacitive transducer, Capacitive displacement sensor, Eddy-current sensor, Grating sensor, Hall effect sensor, Inductive non-contact position sensors, Linear variable differential transformer (LVDT), Multi-axis displacement transducer, Photodiode array, Piezo-electric transducer (piezo-electric), Potentiometer, Proximity sensor (optical), Rotary encoder (angular), String potentiometer, or the like.

In one aspect, the sensor may be a flow sensor to determine a position of the poppet 240. In this regard, the flow sensor may determine an actual flow of the poppet 240 when it should be closed and compare that to a value indicative of a desired closed flow of the poppet 240. If the actual flow is not the same as the desired closed flow, or not within a threshold, the sensor in conjunction with the controller may determine a possible valve failure.

Other types of sensors may be utilized to determine a valve failure such as a resistance to re-seating of the poppet 240 when the actuator 250 ceases pushing. In response thereto, the controller may operate the valve 200 and in particular the actuator 250 to increase or decrease the offset distance 218 to clear a detected jam or contaminant. In one aspect, the controller in response to the sensor would operate in the cleaning operational mode. In this fashion, different operational modes can be employed, such as using a first offset distance in normal operational mode, and transitioning to a second offset distance larger than the first offset distance in the cleaning operational mode (e.g., debris clearing mode).

While aspects in FIGS. 2-4 are shown in two-dimensional manners suggestive of symmetry or uniformity, it is understood that alternative arrangements and shaping of the poppet 240, the valve chamber 214, and other elements can be employed without departing from the scope or spirit of the innovation.

Figure 5:
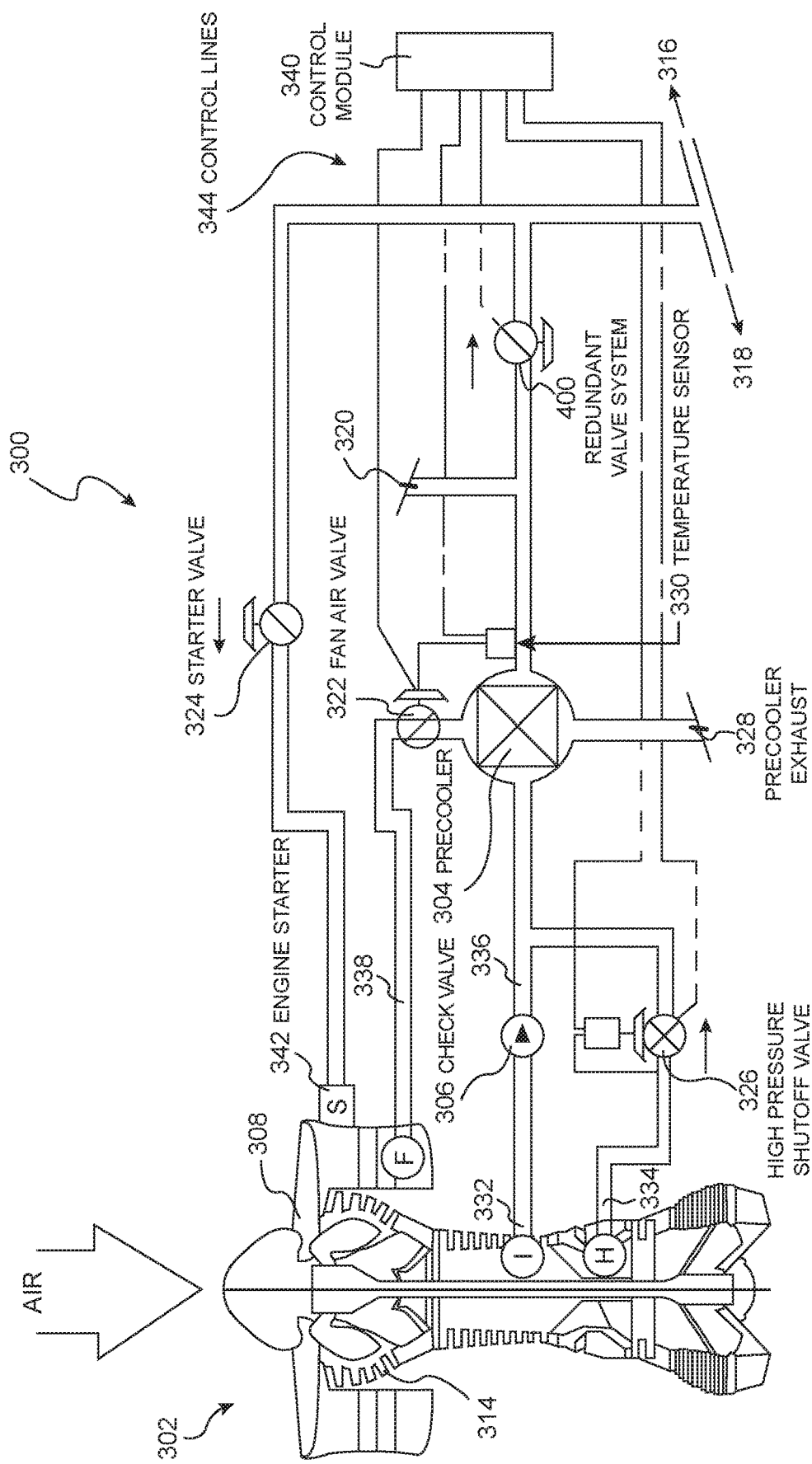
FIG. 5 illustrates a turbine engine schematic with bleed air that is siphoned from the turbine engine in accordance with an aspect of the disclosure.

FIG. 5 illustrates a turbine engine schematic with bleed air that is siphoned from the turbine engine in accordance with an aspect of the disclosure. In this regard, the poppet valves such as the one disclosed above can be employed in a variety of different systems and technologies. Providing one example, FIG. 5 illustrates a system 300 that may include a turbine engine 302 and fluid connections where bleed air from a turbine engine 302 is siphoned off and utilized for other purposes. The turbine engine 302 may be a turbojet engine, a turboprop engine, a turboshaft engine, a propfan engine, or another airbreathing jet engine known in the art. As air enters the turbine engine 302 at the fan 308, the air travels through a compressor 314 where the air becomes heated and pressurized to, for example, temperatures around 1250° F. and pressures around 350 psi. A portion of the air that passes through the compressor 314 may be siphoned off at an outlet 332 and/or an outlet 334.

Figure 6:
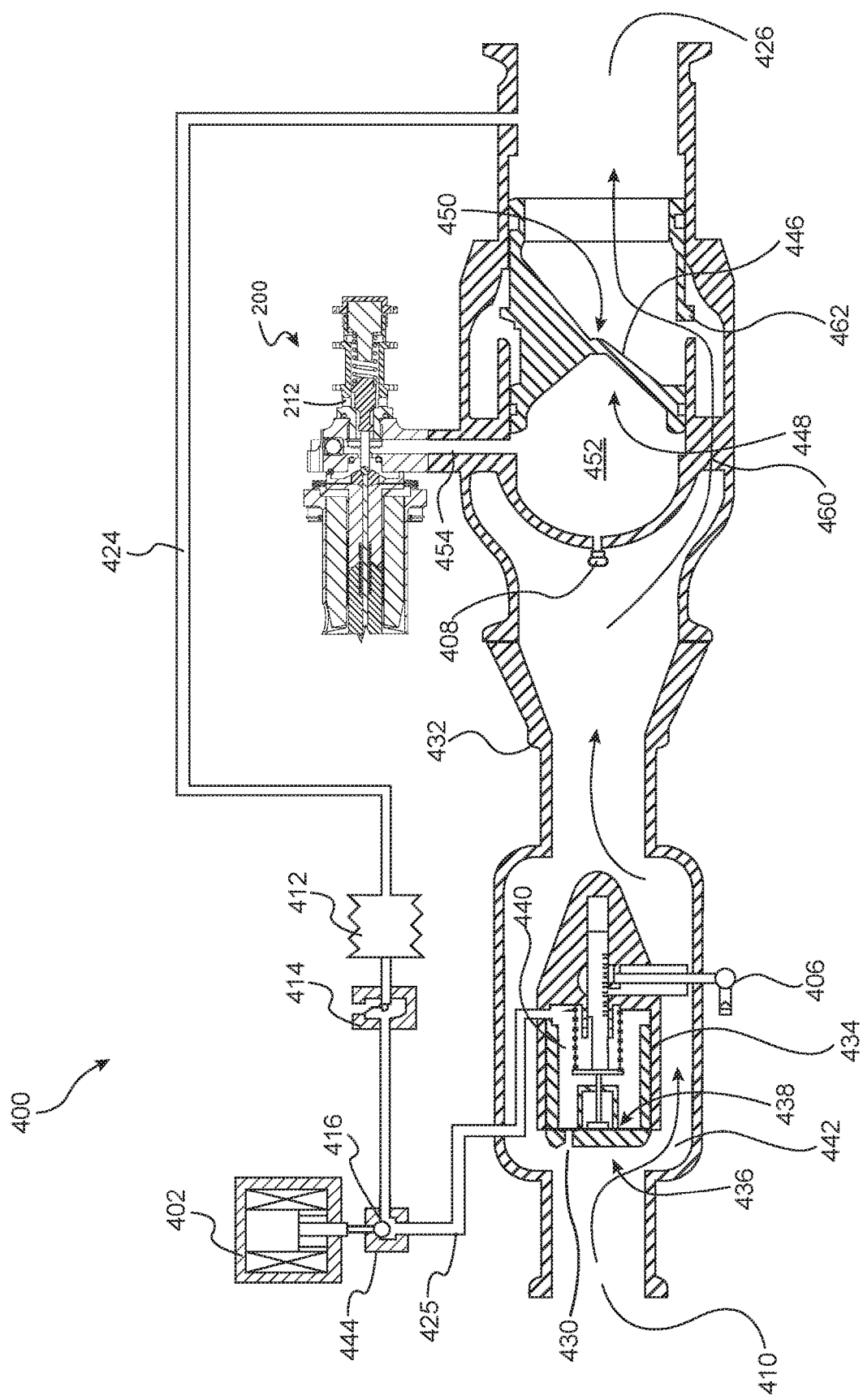
FIG. 6 illustrates a cross-sectional view of a redundant valve system with a downstream valve regulating and open in accordance with an aspect of the disclosure.
Figure 7:
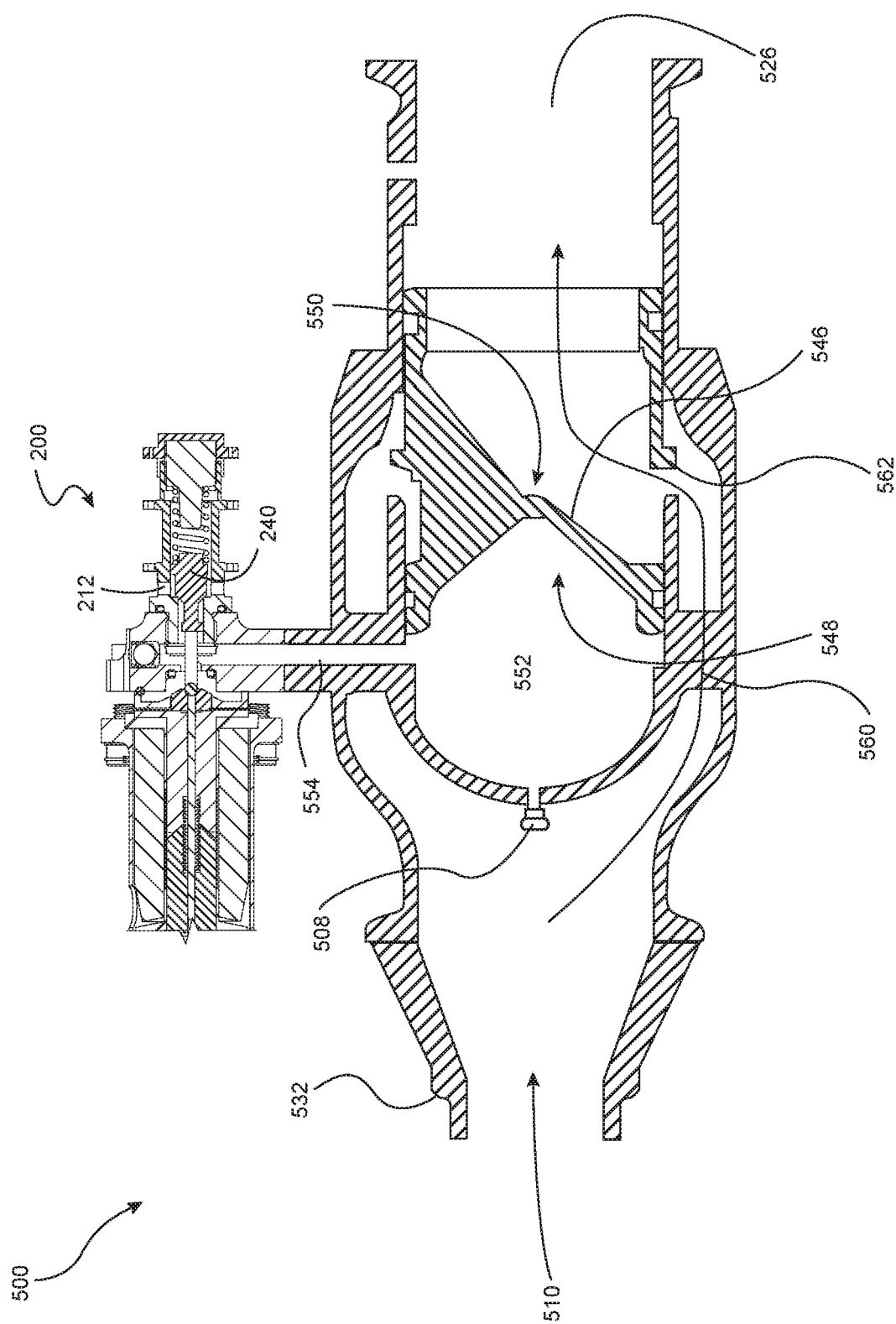
FIG. 7 illustrates a cross-sectional view of a single valve system in accordance with the disclosure.
Figure 8:
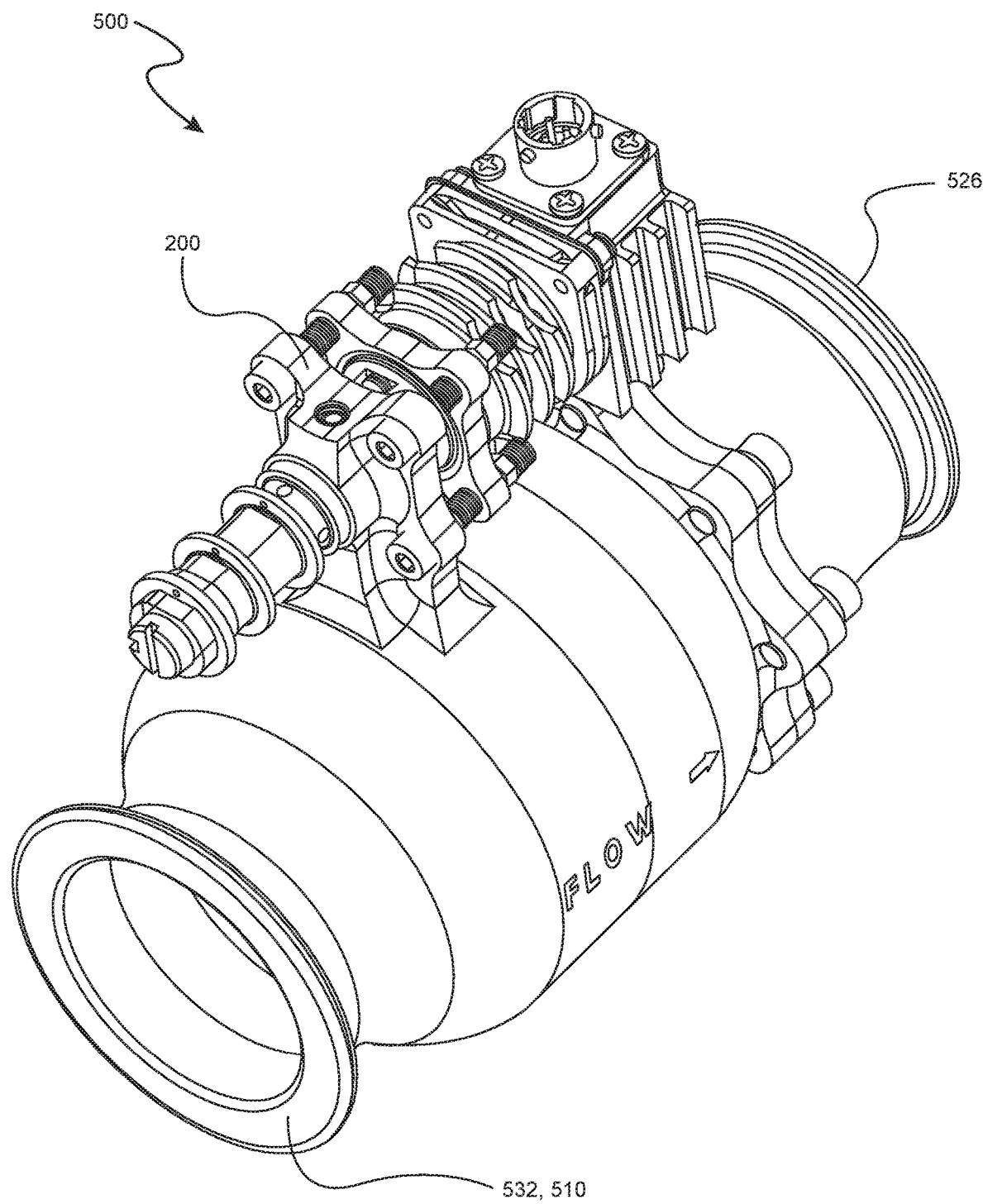
FIG. 8 illustrates a perspective view of the single valve system of FIG. 7.

The turbine engine 302 may be in fluid connection with a first check valve 306 along a conduit 336. Subsequently, there may be a precooler 304 to cool a portion of the bleed air with air from the compressor 314 and/or air from the fan 308 provided by a conduit 338. Subsequently, the bleed air enters a valve system, which regulates the flow of bleed air based on pressure and directs it for other purposes such as de-icing the engine cowl, the wings, or the like at outlet 316 and/or outlet 318. The bleed air may also be provided through outlet 320. This bleed air can also be used to maintain cabin pressurization, de-ice windows, maintain temperature of the cabin and luggage compartments, assist in the function of ejector seats, blow rainwater off the windshield, blow the flaps, and the like. The valve system may be a single valve system 500 as illustrated in FIGS. 7 and 8 or a redundant valve system 400 as illustrated in FIG. 6. In this regard, the disclosure will refer to the valve system as the redundant valve system 400. However, the disclosure has equal applicability in other types of valve systems including the single valve system 500.

Although the redundant valve system 400 is illustrated in FIG. 5 as being downstream of a precooler 304, in some applications, the precooler 304 may not be necessary and the redundant valve system 400 may be directly connected to the turbine engine 302 to siphon air pressurized by the compressor 314.

The system 300 may further include an engine starter 324, a high-pressure shutoff valve 326, a precooler exhaust 328, and a fan air valve 322. The system 300 may further include a controller implemented as a control module 340.

The control module 340 may sense the temperature from a temperature sensor 330, may sense pressure in numerous areas of the redundant valve system 400, may sense temperature in numerous areas of the redundant valve system 400, may sense positions of components of the redundant valve system 400, may control the fan air valve 322, and may control the high-pressure shutoff valve 326. The control module 340 may further control the redundant valve system 400, the single valve system 500, and/or the alternative valve 200. The control module 340 may be implemented with dedicated hardware as defined herein and control system components and/or receive sensor inputs with control lines 344. The control module 340 may sense when a valve of the redundant valve system 400 has failed and further control a second valve of the redundant valve system 400. The control module 340 may include a central processing unit (CPU), a memory, and a communication unit. The CPU may be or may include any known or convenient form of processor and/or controller, such as an appropriately programmed general-purpose microprocessor, special-purpose microprocessor, digital signal processor, programmable microcontroller, application-specific integrated circuit (ASIC), field-programmable gate array (FPGA), a programmable logic device (PLD), or the like, or a combination of any two or more such devices. In one aspect, the control module 340 may implement the functionality of the valve 200 controller.

FIG. 6 illustrates a cross-sectional view of a redundant valve system with a downstream valve regulating and open in accordance with an aspect of the disclosure. In particular, FIG. 6 illustrates the redundant valve system 400 in greater detail, showing a more specific but non-limiting example implementation of the poppet valve disclosed herein. For the avoidance of confusion, components of the redundant valve system having similar names to components of the poppet valve may be referred to as a "system" component herein when referring to elements of the redundant valve system. Similarly, elements of the poppet valve, whether included in the illustrated redundant valve system or another context or aspect, can be referred to as "valve" components.

In the redundant valve system 400, the valve 200 can regulate and open in accordance with an aspect of the disclosure. The redundant valve system 400 may include a housing 432 having an inlet 410 and an outlet 426. The outlet 426 may subsequently connect to the outlet 316 and/or the outlet 318. Towards the inlet 410 end of the housing 432, there is a first piston assembly 434. The first piston assembly 434 may move longitudinally along a centerline of the housing 432. The first piston assembly 434 may have a first cavity 440, which is in fluid connection with the outlet 426. The first cavity 440 may be connected fluidly with the outlet 426 through the connection 425, the regulator servo 414, the regulator bellows 412, and a connection 424. The first piston assembly 434 may also include a control orifice 430, which provides a pneumatic connection between the inlet 410 and the first cavity 440 of the first piston assembly 434.

Along the connection 425, there may be an upstream valve 402. The upstream valve 402 may be a solenoid operated valve or some other similar valve known in the art. The upstream valve 402 may be actuated such that the ball 416 rests in the ball cavity 444 and does not block the connection 425. The upstream valve 402 may also be actuated such that the ball 416 moves down through the connection 425 and blocks the connection 425 to close the upstream valve 402.

In an alternative aspect, the upstream valve 402 may be implemented with a poppet and corresponding valve seat having a construction similar to the poppet 240 and the valve seat 204 illustrated in FIG. 2.

The redundant valve system 400 may also include a second piston assembly 446 towards the outlet 426 end of the redundant valve system 400. The second piston assembly 446 may move longitudinally along a centerline of the housing 432. The second piston assembly 446 may receive the flow of bleed air through the inlet orifice 408. The second piston assembly 446 may have a second cavity 452 as well as an interior face 448 and an exterior face 450. The second cavity 452 is in fluid connection with the vent 212 through a connection 454. The vent 212 vents to atmospheric pressure conditions. The vent 212 may be controlled by the valve 200.

When the valve 200 is not used to regulate the bleed air through the redundant valve system 400, the poppet 240 blocks the connection from the second cavity 452 to the vent 212. When the valve 200 is in operation, the poppet 240 may be actuated by the valve 200 to cause the poppet 240 to extend and vent the second cavity 452 through connection 454 out to vent 212. The poppet 240 may displace from the valve seat by an amount sufficient to permit debris or contamination to blow free of poppet 240 and the vent 212, thereby preventing interference from seizing the poppet 240 during operation. In aspects, the poppet 240 may displace to an offset distance of more than 0.005 inch from the valve seat. In alternative or complementary aspects, the offset distance of poppet 240 from the associated valve seat can be approximately 0.04 inch. In alternative or complementary aspects, the offset distance of the poppet 240 can be variable depending on the action of or signal to an actuator operatively coupled with the poppet 240.

Under normal operation, the valve 200 may be used to shut-off or otherwise control the flow of bleed air through the redundant valve system 400. The redundant valve system 400 may receive unregulated bleed air at the inlet 410 and provide a regulated flow of bleed air at the outlet 426. When the valve 200 is used to shut-off or otherwise control the flow of bleed air, the upstream valve 402 is actuated such that the ball 416 rests in the ball cavity 444. The bleed air received at the inlet typically may have a temperature of around 1250° F. with a pressure of approximately 350 psi for example. As bleed air enters from the inlet 410, it flows through the control orifice 430. The pressure from the bleed air acts on the first face 436 and the second face 438 of the first piston assembly 434.

When the upstream valve 402 actuated such that the ball 416 does not block the connection 425, there is a fluid connection between the inlet 410 and the outlet 426 through the connection 425 through the regulator servo 414, the regulator bellows 412, and the connection 424. Because the outlet 426 is at a lower pressure than the inlet 410, the pressure on the first face 436 may be greater than the pressure forces on the second face 438 and inside the first cavity 440 of the first piston assembly 434. Due to this difference in pressure force, the first piston assembly 434 is actuated towards the outlet 426 of the redundant valve system 400, creating a passageway 442. The bleed air will be able to flow through the inlet 410 through the passageway 442 towards the second piston assembly 446.

When it is desired to have bleed air exit from the outlet 426, the valve 200 is actuated such that the poppet 240 will block the vent 212, which would otherwise outlet to atmospheric pressure conditions. The fluid connection between the second cavity 452 through the connection 454 and to the vent 212 will be closed. Bleed air from the inlet 410 will flow in through the inlet orifice 408 into the second cavity 452 of the second piston assembly 446. The pressure on the interior face 448 will be greater than on the exterior face 450, and will cause the second piston assembly 446 to be actuated towards the outlet 426. This will create a passageway for bleed air at the entrance 462. This will allow bleed air to flow through the passageway 460 through the entrance 462 and out of the outlet 426.

The fluid connection between the inlet 410 and the outlet 426 may also act as a feedback mechanism to control the flow of bleed air through the redundant valve system 400. This may be desirable when the second piston assembly 446 is locked open or if it fails to restrict the flow of air through a passageway 460 below the relief pressure set by the relief valve 406. When the flow of bleed air out of the redundant valve system 400 increases, the pressure at the outlet 426 will also increase. The connections 424 and 425 create a feedback passage into the first cavity 440. An increase in the pressure at the outlet 426 will increase the pressure inside the first cavity 440 and create a retarding force onto the second face 438 of the first piston assembly 434. The first piston assembly 434 may be actuated towards the inlet and restrict the flow of bleed air through the passageway 442.

The regulator servo 414 and the regulator bellows 412 may also be used to control the feedback pressure in the first cavity 440. The regulator servo 414 may be an electrofluid servo valve, which receives an analog or digital input signal to actuate the regulator bellows 412 from the control module 340. The regulator bellows 412 may be used to control the regulator servo 414 in adjusting the feedback pressure through the connections 424 and 425 from the outlet 426. The regulator bellows 412 may be actuated to decrease or increase feedback pressure from the outlet 426 depending on the desired flow of bleed air through the redundant valve system 400.

When the valve 200 is used to relieve the flow of bleed air and it is desired to stop the flow of bleed air through the outlet 426, the valve 200 will be actuated such that the poppet 240 will be actuated towards the valve 200, opening the fluid connection between the second cavity 452 to the vent 212. Because the vent 212 outlets to atmospheric pressure, the pressure inside the second cavity 452 will be less than the pressure at the outlet 426. The pressure on the exterior face 450 of the second piston assembly 446 will be greater than the pressure on the interior face 448 of the second piston assembly 446. The second piston assembly 446 will be actuated towards the inlet 410 end of the redundant valve system 400. This will close the entrance 462 and restrict the flow of bleed air past the second piston assembly 446.

In some previous designs, there was a fluid connection between the first cavity 440 and a point along the housing 432 between the first piston assembly 434 and the second piston assembly 446. In this situation, the pressure of the feedback bleed air into the first cavity 440 would be relatively high. This would cause the first piston assembly 434 to close, which would stop the flow of bleed at the inlet 410. In turn, this would drop the pressure at the fluid connection point and cause the first piston assembly 434 to open again. The process would repeat causing oscillations in the opening/closing of the first piston assembly 434, which unnecessary introduced extra wear and tear on the system. By establishing a fluid connection with the outlet 426 through the connections 424 and 425, the pressure of the outlet 426 remains significantly lower than the pressure at the inlet 410. This prevents the first piston assembly 434 from unnecessarily opening and closing due to the pressure within the first cavity 440.

In the event of failure of the second piston assembly 446, the second piston assembly 446 will fail open. The passageway 460 may permit the flow of bleed air past the second piston assembly 446. Because of the fluid connection between the first cavity 440 and the outlet 426, the pressure within first cavity 440 will be lower compared to the pressure at the inlet 410. The pressure on the first face 436 will be greater than the pressure on the second face 438, which will actuate the first piston assembly 434 into an open position. This will permit the bleed air to flow through the passageway 442. The bleed air will continue past the second piston assembly 446 through the passageway 460 and out of the outlet 426.

When it is desired to restrict the flow of bleed air out of the outlet 426, the upstream valve 402 may be actuated to cause the ball 416 to block the connection 425. By blocking the connection 425, the fluid connection between the first cavity 440 and the outlet 426 may be closed. Now, when the bleed air flows from the inlet 410 through the control orifice 430 and into the first cavity 440, the pressure inside the first cavity 440 will be roughly equivalent to the pressure at the inlet 410. The pressure on the first face 436 will be roughly equivalent to the pressure on the second face 438. Due to the larger surface area of the second face 438, the first piston assembly 434 may be actuated towards the inlet and seal the passageway 442. By sealing the passageway 442, the flow of bleed air from the inlet 410 through the redundant valve system 400 will be stopped.

FIG. 7 illustrates a cross-sectional view of a single valve system in accordance with the disclosure; and FIG. 8 illustrates a perspective view of the single valve system of FIG. 7. In particular, FIG. 7 illustrates an example single valve system 500 in accordance with the disclosure. The valve system 500 includes a piston assembly 546 operatively coupled with the valve 200. The piston assembly 546 includes an inlet 510 at one end of housing 532, and an outlet 526 on an opposite end. The piston assembly 546 has an internal face 548 and an internal face 550 bounding cavity 552 adjacent passageway 560 and the entrance 562. The cavity 552 is, on its opposite side, operatively coupled with inlet orifice 508. Connection 554 connects the cavity 552 to the valve 200 including the poppet 240 and the vent 212. All of the above noted structure described in relation to FIG. 7 may operate in a manner consistent with the associated structure related to the description above with respect to FIG. 6.

Accordingly, there has been disclosed pressure regulating valve systems that are resistant to blockages while also being compact and lightweight that may be utilized in single valve systems, redundant valve systems, and other applications. The bleed air controlled by the pressure regulating valve system may be used to de-ice cowls, maintain cabin pressurization, de-ice windows, maintain temperature of the cabin and luggage compartments, assist in the function of ejector seats, provide air for blown flaps, provide air for windshield blow mechanisms, and the like. The disclosed valves are reliable in performance, low in weight, and compact in size. These valves may be self-powered by using the pressure generated within the system itself for supplying the energy to actuate the valve.

Further in accordance with various aspects of the disclosure, the processes described herein are intended for operation with dedicated hardware implementations including, but not limited to, processors, microprocessors, computers, PCs, semiconductors, application specific integrated circuits (ASIC), programmable logic arrays, cloud computing devices, and other hardware devices constructed to implement the processes described herein.

In addition to the systems described above, various processes are disclosed herein, such as a process for operating a valve. In an aspect, a process can comprise providing a valve including a valve seat, a poppet, and an actuator. The valve seat can be disposed between the inlet and the outlet of the valve, and the valve seat can have a seat opening defined by a seat-opening dimension. The valve seat is fixed in relation to the valve. The poppet includes a seat face opposing the valve seat and an outlet face opposing the outlet end, and the seat face tapers from a poppet large dimension larger than the seat opening dimension disposed toward the inlet end to a poppet small dimension smaller than the seat opening dimension disposed toward the outlet end. The poppet can be movable in relation to the valve housing, the actuator operatively coupled with the poppet. Once this or similar structures are provided, the process further includes energizing the actuator to open the valve by causing the seat face of the poppet to move at least an offset distance from the valve seat during an opening operation. In aspects, processes can further comprise de-energizing the actuator to close the valve by causing the seat face of the poppet to return at least the offset distance back to the valve seat during a closing operation. Alternative or complementary aspects can include providing a probe between the actuator and the poppet.

The many features and advantages of the disclosure are apparent from the detailed specification, and, thus, it is intended by the appended claims to cover all such features and advantages of the disclosure, which fall within the true spirit, and scope of the disclosure. Moreover, the disclosure incorporates by reference in its entirety U.S. patent application Ser. No. 15/042,644, filed Feb. 12, 2016 assigned to the present assignee. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A valve system comprising:
a valve and further comprising a bleed air valve that controls bleed air distribution from a turbine, wherein the valve controls an operation of the bleed air valve;
the valve to provide regulated fluid flow, and the valve comprising:
a valve housing having an inlet at an inlet end which receives a fluid, and an outlet at an outlet end which provides regulated fluid flow, a structure of the valve housing defining a valve chamber;
a valve seat arranged between the inlet and the outlet of the valve, the valve seat having a seat opening defined by a seat opening dimension, the valve seat fixed in relation to the valve housing;
a poppet arranged between the valve seat and the outlet of the valve, the poppet having a seat face opposing the valve seat and an outlet face opposing the outlet end, the seat face tapers from a poppet large dimension larger than the seat opening dimension arranged toward the inlet end to a poppet small dimension smaller than the seat opening dimension arranged toward the outlet end, the poppet being configured to be movable in relation to the valve housing;
a plunger operatively coupled with the poppet, the plunger arranged toward the inlet end, the plunger being movable in relation to the valve housing; and
a solenoid within the valve chamber operatively coupled with the plunger, the solenoid provides a displacement force on at least the plunger,
wherein the poppet is configured to be offset from the valve seat by a variable distance based on actuation of the solenoid; and
wherein the variable distance comprises a first distance defining a normal operational mode, and a second distance defining a cleaning operational mode, greater than the first distance, to clear foreign object debris.

2. The valve system of claim 1, further comprising:
a controller configured to control the actuation of the solenoid to offset the poppet from the valve seat by the variable distance,
wherein the poppet comprises a conical surface and the valve seat comprises a conical surface; and wherein the conical surfaces are configured to mate one against the other.

3. The valve system of claim 2, further comprising:
a sensor configured to sense a position of the poppet offset from the valve seat.

4. The valve system of claim 1, further comprising:
a sensor configured to sense a valve failure,
wherein the poppet is configured to be offset from the valve seat by more than 0.005 inch.

5. The valve system of claim 3, wherein the sensor comprises at least one of the following: a position sensor configured to determine a position of the poppet offset from the valve seat and a flow sensor configured to determine a flow past the poppet indicative of the poppet being offset from the valve seat.

6. A process comprising:
providing a valve including a valve seat, a poppet, and an actuator, the valve seat arranged between an inlet and an outlet of the valve, the valve seat having a seat opening defined by a seat opening dimension, the valve seat fixed in relation to the valve, the poppet having a seat face opposing the valve seat and an outlet face arranged toward the outlet, the seat face tapers from a poppet large dimension larger than the seat opening dimension arranged toward the inlet to a poppet small dimension smaller than the seat opening dimension arranged toward the outlet, the poppet movable in relation to a valve housing, the actuator operatively coupled with the poppet;
providing a bleed air valve that controls bleed air distribution from a turbine; and
controlling a position of the valve to control a position of the bleed air valve;
energizing the actuator to open the valve by causing the seat face of the poppet to move at least a first offset distance from the valve seat during an opening operation; and
energizing the actuator to open the valve by causing the seat face of the poppet to move at least a second offset distance from the valve seat to clear foreign object debris during a cleaning operation.

7. The process of claim 6, further comprising:
implementing a controller to control the actuator to offset the poppet from the valve seat by a variable distance; and
de-energizing the actuator to close the valve by causing the seat face of the poppet to return at least the offset distance back to the valve seat during a closing operation.

8. The process of claim 6, further comprising: implementing a sensor configured to sense a valve failure; and providing a probe between the actuator and the poppet.

9. The process of claim 8, wherein the probe is fixed in relation to the poppet; and wherein the sensor comprises at least one of the following: a position sensor configured to determine a position of the poppet offset from the valve seat and a flow sensor configured to determine a flow past the poppet indicative of the poppet being offset from the valve seat.

10. The process of claim 6, wherein the valve housing defines a valve chamber about the inlet and the outlet; wherein the poppet comprises a conical surface and the valve seat comprises a conical surface; and wherein the conical surfaces are configured to mate one against the other.

11. A valve system to provide a regulated fluid flow, comprising:
a system housing having a system inlet at a system inlet end, which receives a pressurized fluid, and a system outlet at a system outlet end which provides the regulated fluid flow;
a piston assembly arranged in the system housing having a cavity, the cavity having a fluid connection to a vent, the piston assembly configured to regulate the fluid flow; and
a valve to control the fluid connection and control a position of the piston assembly, the valve including:
a valve housing having a valve inlet at a first end which receives a fluid, and a valve outlet at a second end which provides regulated fluid flow, a structure of the valve housing defining a valve chamber,
a valve seat arranged between the valve inlet and the valve outlet, the valve seat having a seat opening defined by a seat opening dimension, the valve seat fixed in relation to the valve housing,
a poppet arranged between the valve seat and the valve outlet, the poppet having a seat face opposing the valve seat and an outlet face opposing a valve outlet end, the seat face tapers from a poppet large dimension larger than the seat opening dimension arranged toward a valve inlet end to a poppet small dimension smaller than the seat opening dimension arranged toward the valve outlet end, the poppet movable in relation to the valve housing,
a plunger operatively coupled with the poppet, the plunger arranged toward the valve inlet end, the plunger movable in relation to the valve housing, and
a solenoid within the valve chamber operatively coupled with the plunger, the solenoid provides a displacement force on at least the plunger,
wherein the poppet is configured to be offset from the valve seat by a variable distance based on actuation of the solenoid; and
wherein the variable distance comprises a first distance defining a normal operational mode, and a second distance defining a cleaning operational mode, greater than the first distance, to clear foreign object debris.

12. The valve system of claim 11, further comprising:
a controller configured to control the actuation of the solenoid to offset the poppet from the valve seat by the variable distance,
wherein the poppet comprises a conical surface and the valve seat comprises a conical surface;
wherein the conical surfaces are configured to mate one against the other; and wherein the plunger is fixed in relation to the poppet.

13. The valve system of claim 11, further comprising:
a sensor configured to sense a position of the poppet offset from the valve seat.

14. The valve system of claim 13, further comprising:
a sensor configured to sense a valve failure,
wherein the poppet is configured to be offset from the valve seat by more than 0.005 inch.

15. The valve system of claim 11, wherein the poppet comprises a conical surface and the valve seat comprises a conical surface; and wherein the conical surfaces are configured to mate one against the other.

16. The valve system of claim 11, further comprising a sensor configured to sense a valve failure, wherein the sensor comprises at least one of the following: a position sensor configured to determine a position of the poppet offset from the valve seat and a flow sensor configured to determine a flow past the poppet indicative of the poppet being offset from the valve seat.

17. The valve system of claim 11, further comprising:
a sensor configured to sense a position of the poppet offset from the valve seat, wherein the poppet is configured to offset from the valve seat by a variable distance based on actuation of the solenoid.

18. The valve system of claim 11, further comprising at least one relief valve.

\* \* \* \* \*